United States Patent
Raun et al.

(10) Patent No.: US 6,601,341 B2
(45) Date of Patent: Aug. 5, 2003

(54) PROCESS FOR IN-SEASON FERTILIZER NITROGEN APPLICATION BASED ON PREDICTED YIELD POTENTIAL

(75) Inventors: William R. Raun, Stillwater, OK (US); Gordon V. Johnson, Stillwater, OK (US); John B. Solie, Stillwater, OK (US); Marvin L. Stone, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

(21) Appl. No.: 09/911,867

(22) Filed: Jul. 24, 2001

(65) Prior Publication Data

US 2003/0019151 A1 Jan. 30, 2003

(51) Int. Cl.$^7$ .............................................. A01B 79/02
(52) U.S. Cl. ........................................ 47/58.1; 47/48.5
(58) Field of Search ................................ 47/48.5, 58.1; 71/7, 30, 49, 54; 382/110; 504/251

(56) References Cited

U.S. PATENT DOCUMENTS

| | | | | |
|---|---|---|---|---|
| 3,670,963 A | * | 6/1972 | Stroebel et al. | 239/77 |
| 3,910,701 A | | 10/1975 | Henderson et al. | 356/39 |
| 4,952,229 A | * | 8/1990 | Muir | 71/7 |
| 5,144,767 A | | 9/1992 | McCloy et al. | 47/1.7 |
| 5,222,324 A | | 6/1993 | O'Neall et al. | 47/1.7 |
| 5,296,702 A | | 3/1994 | Beck et al. | 250/226 |
| 5,389,781 A | | 2/1995 | Beck et al. | 250/226 |
| 5,507,115 A | | 4/1996 | Nelson | 47/1.7 |
| 5,585,626 A | | 12/1996 | Beck et al. | 250/222.1 |
| 5,606,821 A | | 3/1997 | Sadjadi et al. | 47/1.7 |
| 5,763,873 A | | 6/1998 | Beck et al. | 250/214 B |
| 5,764,819 A | * | 6/1998 | Orr et al. | 382/110 |
| 5,768,823 A | | 6/1998 | Nelson | 47/1.7 |
| 5,789,741 A | | 8/1998 | Kinter et al. | 250/226 |
| 5,793,035 A | | 8/1998 | Beck et al. | 250/222.1 |
| 5,809,440 A | | 9/1998 | Beck et al. | 701/50 |
| 5,833,144 A | | 11/1998 | Kinter | 239/462 |
| 5,837,997 A | | 11/1998 | Beck et al. | 250/227.11 |
| 6,052,187 A | | 4/2000 | Krishnan et al. | |
| 6,062,496 A | | 5/2000 | Kinter | 239/462 |
| 6,160,902 A | * | 12/2000 | Dickson et al. | 382/110 |
| 6,366,681 B1 | * | 4/2002 | Hutchins | 382/110 |
| 6,393,927 B1 | | 5/2002 | Biggs et al. | |
| 6,444,975 B1 | | 9/2002 | Reusch | |

FOREIGN PATENT DOCUMENTS

| | | |
|---|---|---|
| DE | 198 60 306 A1 | 3/2000 |
| DE | 199 13 971 A1 | 9/2000 |
| WO | WO 01/45490 A1 | 6/2001 |

OTHER PUBLICATIONS

Patchen Weed Seeker™ PhD1620 Brochure, Undated.
Patchen Weed Seeker™ PhD600 Brochure, Undated.

* cited by examiner

*Primary Examiner*—Charles T. Jordan
*Assistant Examiner*—Bret Hayes
(74) *Attorney, Agent, or Firm*—Fellers, Snider, Blankenship, Bailey & Tippens, P.C.

(57) ABSTRACT

A method for in-season fertilizer nitrogen application based on predicted yield potential and a nutrient response index. The inventive method includes the steps of: determining a nutrient response index for a field; determining the normalized difference vegetation index of an area to fertilize; determining a predicted crop yield for the area; determining an attainable crop yield for the area; determining nitrogen uptake for the vegetation within the area; and determining the amount of fertilizer nitrogen required by said vegetation. In one embodiment, the normalized difference vegetation index is determined by scanning an area to fertilize with a spectral reflectance sensor which provides reflectance values for red light and near infrared light. The normalized difference vegetation index (NDVI) is defined by: NDVI=(NIR−red)/(NIR+red) where "NIR" is the reflectance value for near infrared light and "red" is the reflectance value for red light.

9 Claims, 7 Drawing Sheets

PROCESS FOR IN-SEASON FERTILIZER NITROGEN APPLICATION BASED ON PREDICTED YIELD POTENTIAL

BACKGROUND OF THE INVENTION

1. Field of the Invention

This invention relates generally to a method for determining a rate of application of nitrogen fertilizer. More particularly, but not by way of limitation, the present invention relates a method for determining the existing nitrogen available for a plant and predicting the amount of nitrogen fertilizer to required to achieve a predicted yield potential.

2. Background

Presently, there is a need for a convenient method to determine the amount of fertilizer required to maximize the yield of a particular crop. While soil samples may be analyzed to determine the soil condition, the process is neither convenient nor is it conducive to advanced farming techniques such as precision farming.

"Precision farming" is a term used to describe the management of intrafield variations in soil and crop conditions. "Site specific farming", "prescription farming", and "variable rate application technology" are sometimes used synonymously with precision farming to describe the tailoring of soil and crop management to the conditions at discrete, usually contiguous, locations throughout a field. The size of each location depends on a variety of factors, such as the type of operation performed, the type of equipment used, the resolution of the equipment, as well as a host of other factors. Generally speaking, the smaller the location size, the greater the benefits of precision farming, at least down to approximately one square meter.

Typical precision farming techniques include: varying the planting density of individual plants based on the ability of the soil to support growth of the plants; and the selective application of farming products such as herbicides, insecticides, and, of particular interest, fertilizer.

In contrast, the most common farming practice is to apply a product to an entire field at a constant rate of application. The rate of application is selected to maximize crop yield over the entire field. Unfortunately, it would be the exception rather than the rule that all areas of a field have consistent soil conditions and consistent crop conditions. Accordingly, this practice typically results in over application of product over a portion of the field, which wastes money and may actually reduce crop yield, while also resulting in under application of product over other portions of the field, which may also reduce crop yield.

Perhaps even a greater problem with the conventional method is the potential to damage the environment through the over application of chemicals. Excess chemicals, indiscriminately applied to a field, ultimately find their way into the atmosphere, ponds, streams, rivers, and even the aquifer. These chemicals pose a serious threat to water sources, often killing marine life, causing severe increases in algae growth, leading to eutrophication, and contaminating potable water supplies.

Thus it can be seen that there are at least three advantages to implementing precision farming practices. First, precision farming has the potential to increase crop yields, which will result in greater profits for the farmer. Second, precision farming may lower the application rates of seeds, herbicides, pesticides, and fertilizer, reducing a farmer's expense in producing a crop. Finally, precision farming will protect the environment by reducing the amount of excess chemicals applied to a field, which may ultimately end up in a pond, stream, river, and/or other water source.

Predominately, precision farming is accomplished by either: 1) storing a prescription map of a field wherein predetermined application rates for each location are stored for later use; or 2) by setting application rates based on real-time measurements of crop and/or soil conditions. In the first method, a global positioning system (GPS) receiver, or its equivalent, is placed on a vehicle. As the vehicle moves through the field, application rates taken from the prescription map are used to adjust variable rate application devices such as spray nozzles. A number of difficulties are associated with the use of such a system, for example: due to the offset between the GPS receiver and the application device, the system must know the exact attitude of the vehicle in order to calculate the precise location of each application device, making it difficult to achieve a desirable location size; soil and plant conditions must be determined and a prescription developed and input prior to entering the field; and resolving a position with the requisite degree of accuracy requires relatively expensive equipment.

In the latter method, a sensor is used to detect particular soil and plant conditions as the application equipment is driven through the field. The output of the sensor is then used to calculate application rates and adjust a variable rate application device in real time. Since the physical relationship between the sensor and the application device is fixed, the problems associated with positional based systems (i.e., GPS) are overcome. In addition, the need to collect data prior to entering the field is eliminated, as is the need for a prescription map.

With either technique, there is a need to sense the soil and/or crop conditions in order to determine a rate of application of a given farm product. With regard to soil analysis, attempting to analyze the soil condition by way of a soil sample at each site would be time consuming and the handling of individual samples would be a logistical nightmare. Even with in-field analysis, the task would be daunting, at best.

In the past, the measuring of plant reflectance has shown some promise for identifying specific growing conditions. The measurement of plant reflectance is noninvasive to growing crops, may be performed very quickly, and is exceptionally conducive to advanced farming techniques. Unfortunately, there has been no method to interpret such information to determine the application rate of fertilizer. An example of a device which uses reflectance for the selective application of herbicide is described in U.S. Pat. No. 5,585,626 issued to Beck et al.

Thus it is an object of the present invention to provide a convenient method for determining an application rate for the in-season application of fertilizer nitrogen, which is non-invasive to growing crops and is conducive to advanced farming techniques.

SUMMARY OF THE INVENTION

The present invention provides a method for determining in-season fertilizer nitrogen application based on predicted yield potential and a nutrient response index. In a preferred embodiment of the inventive method, an optical sensor is used to measure the reflectance of a target plant at one or more wavelengths of light and, based on known reflectance properties of the target, an output is provided which is indicative of the need for nitrogen. The inventive process, however, is not limited to nitrogen but rather is applicable to any crop nutrient whose projected need could be based on predicted uptake in the grain, derived from predicted yield.

Efficiency of site-specific fertilizer management is largely determined by how well small-scale spatial variability is managed and the time when fertilizers are applied. During the crop growing season (in-season), knowledge of yield potential is a key to successful variable rate fertilizer applications, particularly for topdress nitrogen. Maximum yield potential ("$YP_{MAX}$") is the theoretical maximum dry grain yield that could be produced per unit area when manageable yield factors are non-limiting in a specific growing season. In the inventive method, a normalized difference vegetation index (NDVI) is calculated from reflectance information gathered by scanning a plant. Once NDVI is determined, an in-season estimated yield (INSEY) index may be calculated by dividing NDVI by the number of growing days from planting, which is further used to determine potential yield ($YP_0$), the predicted yield with no additional nitrogen fertilization. A response index ($RI_{NDVI}$) is calculated, which is a measure of the expected response of the crop to adequate levels of fertilizer. $RI_{NDVI}$ is determined by sensing NDVI of plants in a plot receiving adequate but not excessive pre-plant nitrogen divided by the NDVI of plants receiving conventional management. Based on these measurements, the predicted yield which can be attained with added nitrogen ($YP_N$), may be projected by the equation:

$$YP_N = YP_0 * RI_{NDVI}$$

Through a series of calculations, YPN is used to determine the topdress fertilizer nitrogen requirement.

Virtually any method of measuring the reflectance of individual plants or small groups of plants will provide the desired results. However, preferred methods of measuring reflectance include: 1) the use of a passive sensor as described hereinbelow or 2) the use of an active sensor as described in co-pending U.S. patent application, Ser. No. 09/912,077 entitled "Optical Spectral Reflectance Sensor and Controller" and filed contemporaneously herewith, which is incorporated herein by reference.

Typically, an active sensor comprises: a light emitter which provides one or more light sources, each source producing light at a specific wavelength; a modulator for modulating each light source at a particular frequency, a reflected light receiver for receiving, detecting, and discriminating each wavelength of light; a direct receiver for receiving light directly from each source; and a processor for gathering information from the receivers and processing such information to determine reflectance of a plant.

A passive sensor, on the other hand, includes up-looking detectors and down-looking detectors such that the actual reflectance of the target plant may be determined. The desired wavelengths of light are separated for use by both the up-looking and down-looking detectors using optical filters or the like.

In the preferred method, the reflectance properties of a target are known to vary based on the amount of nitrogen available to the plant. By measuring the reflected light, at particular wavelengths, preferably in the ranges of red and near infrared, and the intensity of the light source at the same wavelengths, it is possible to predict, with a reasonable degree of certainty, the expected crop yield with the present level of available nitrogen and the maximum crop yield if an ideal amount of nitrogen fertilizer is added. This information may be used in real time to control a variable rate applicator for applying a mid-growing season nitrogen fertilizer or, alternatively, used to develop a prescription map for later application of mid-growing season nitrogen fertilizer to a field. The location size in a site-specific application utilizing the present method is limited only by the resolution of the sensor and the resolution of the applicator.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1A:
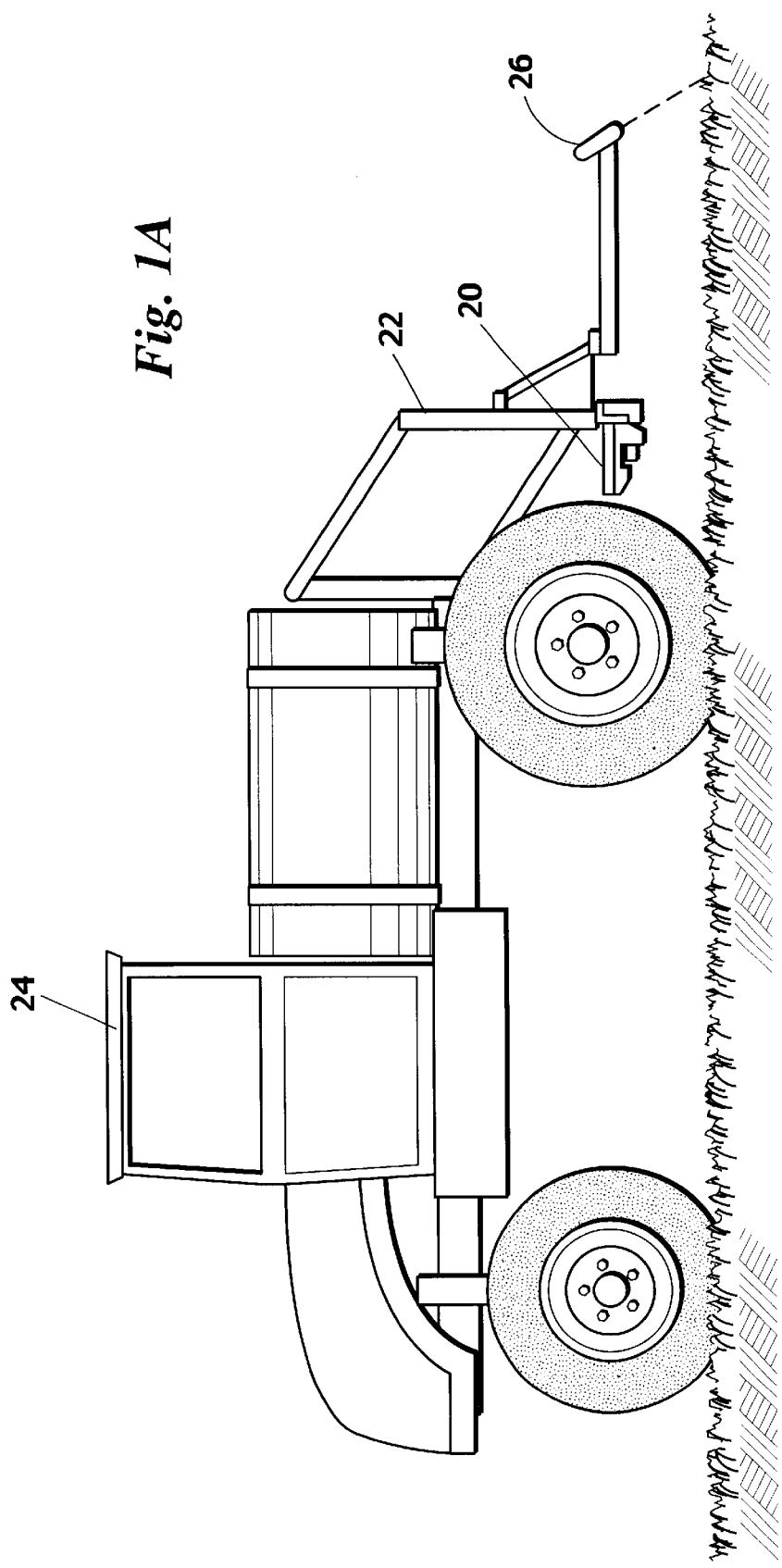
FIG. 1A provides a side view of a farming vehicle having multiple sensors and spray nozzles for use with the inventive method mounted thereon.
Figure 1B:
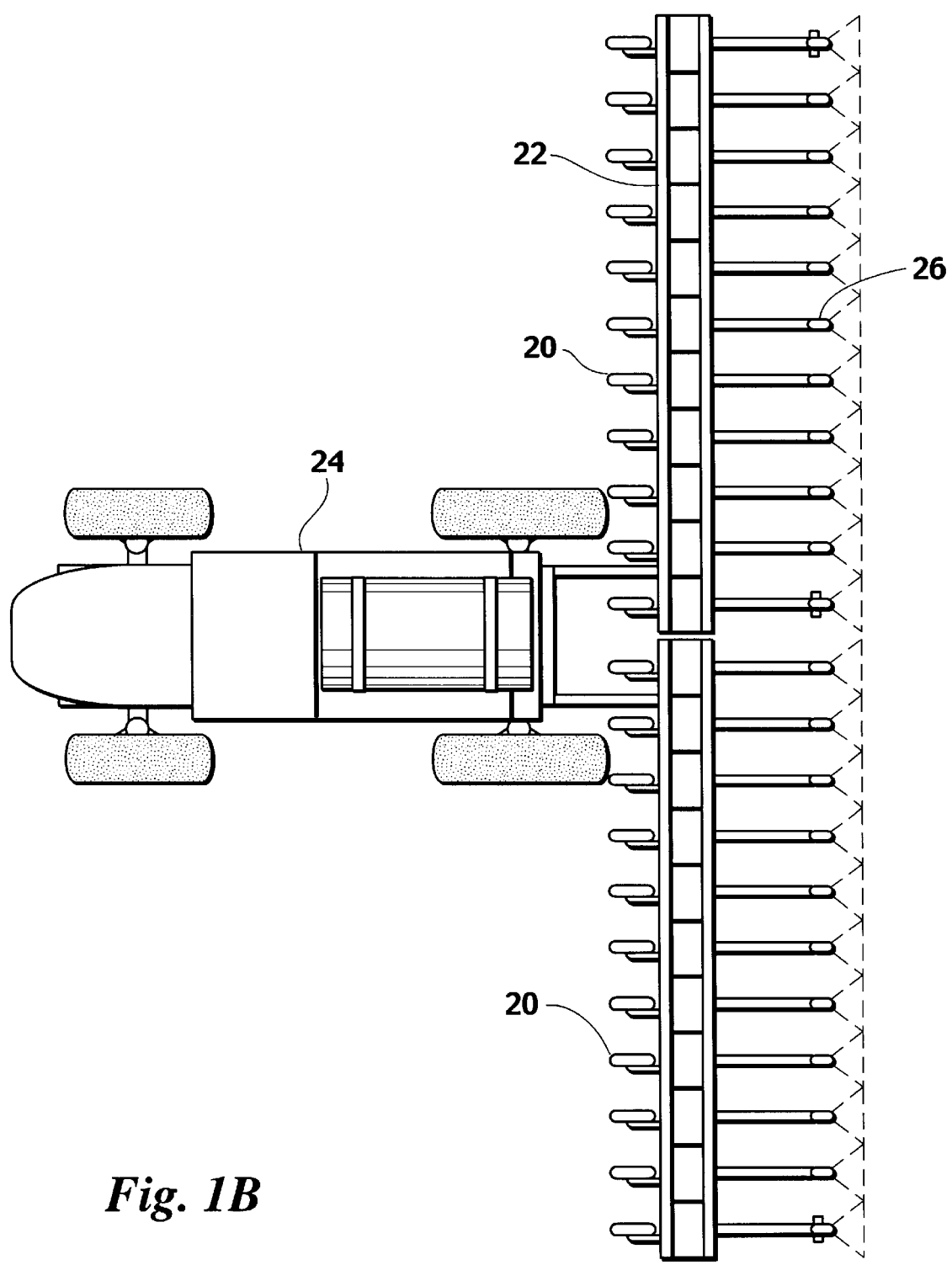
FIG. 1B provides a top view of the farming vehicle having a typical arrangement of sensors and spray nozzles for use with the inventive method mounted thereon.

Referring now to the drawings, wherein like reference numerals indicate the same parts throughout the several views, a preferred embodiment of the inventive method is incorporated in the fertilizer spreading vehicle 24 shown in FIGS. 1A and 1B. In one application, a plurality of sensors, of which sensor 20 is representative, are disposed along boom 22 at substantially equal spacings. Preferably, boom 22 extends laterally from vehicle 24. Spray nozzles, of which nozzle 26 is representative, are also disposed along boom 22 preferably such that a nozzle 26, or group of nozzles, corresponds to each sensor 20. As the vehicle 24 travels along a crop row, boom 22 projects over the plants such that each sensor 20 measures the reflectance of plants in its immediate view, using the inventive method, determines the extent to which nitrogen fertilizer is needed, and controls the rate of application of fertilizer through its corresponding nozzle 26.

Figure 2:
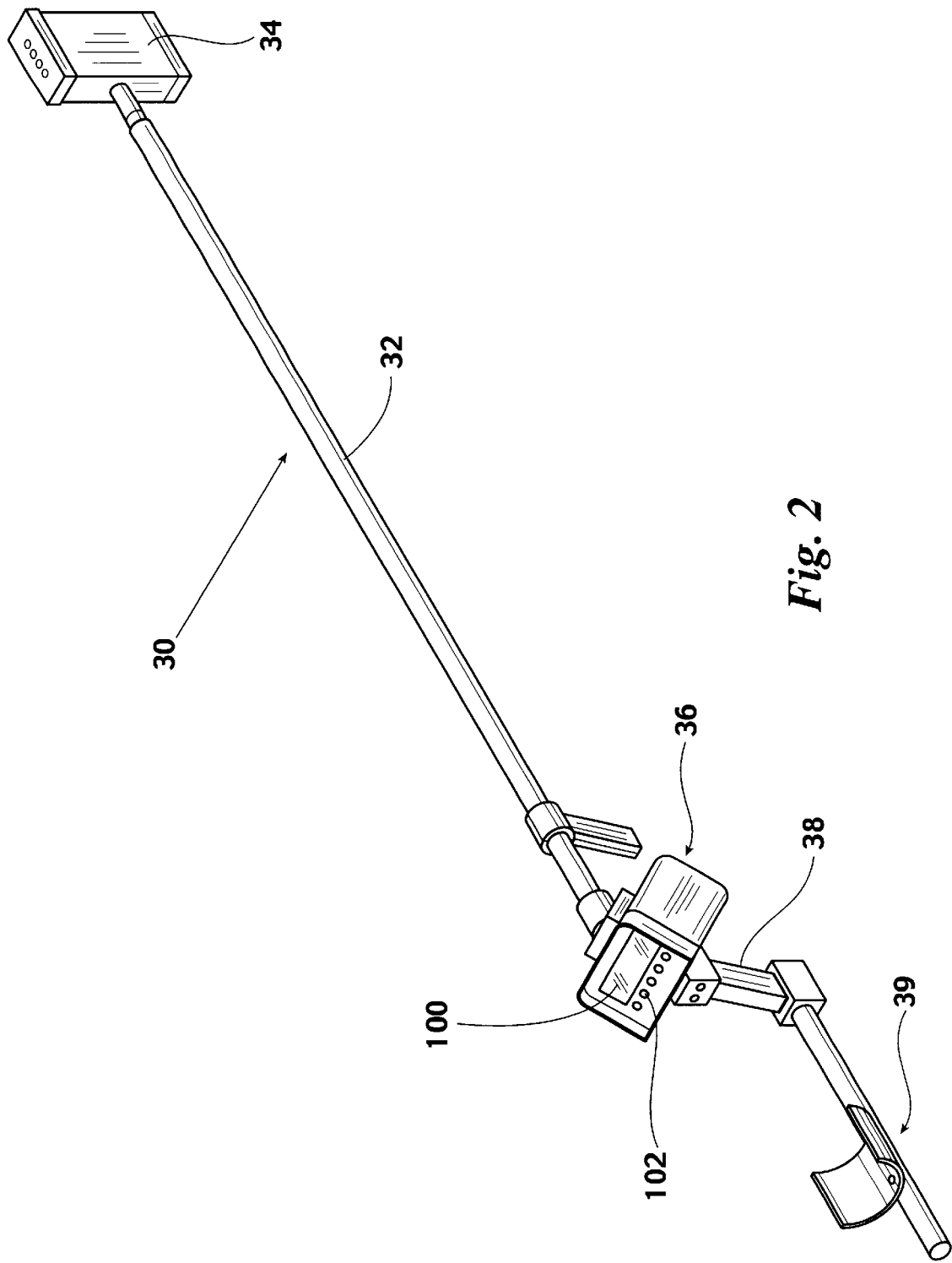
FIG. 2 provides a perspective view of a hand held analyzer wherein a passive sensor is employed.

The inventive method may also be used to determine fertilizer requirements for incorporation into a prescription map or even for fertilizer requirements for a blanket application of fertilizer to an entire field. A convenient method for making such measurements is with a handheld analyzer 30 as shown in FIG. 2. Analyzer 30 comprises: an elongated beam 32; reflectance sensor 34 secured to the forward end of beam 32; a controller 36 mounted at the rearward end of beam 32; a pistol grip 38 for holding analyzer 30; and an arm rest 39 for counter balancing analyzer 30 while in use.

Figure 3:
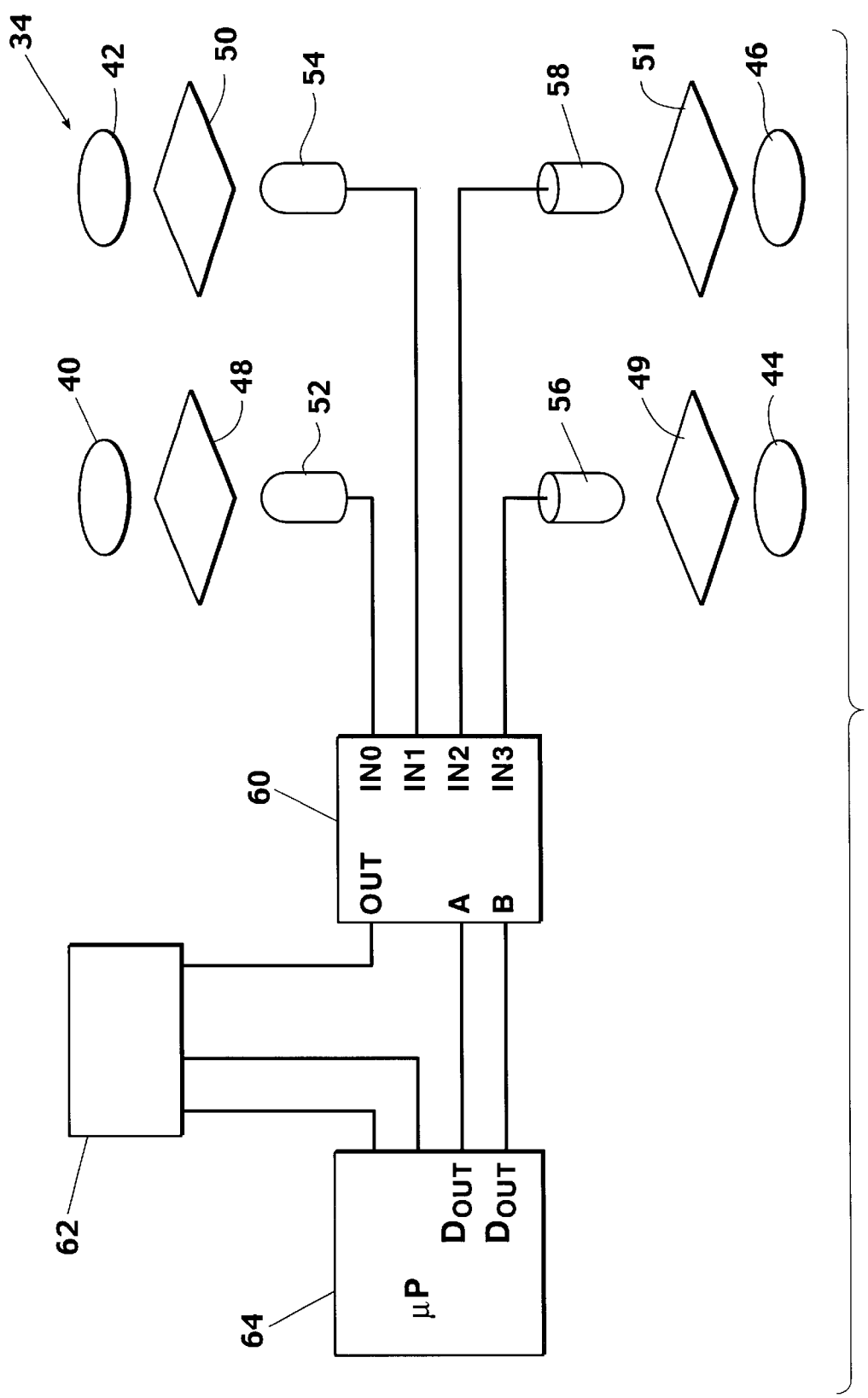
FIG. 3 provides a block diagram of a passive reflectance sensor suitable for use with the inventive method.

Generally speaking, a sensor may either emit light which is then reflected back to a receiver, referred to herein as an "active sensor" since the sensor actively produces its own light, or a sensor may take advantage of available light to measure reflectance properties which, for purposes of this invention, is referred to as a "passive sensor". Either sensor is well suited for use with analyzer 30. By way of example and not limitation, analyzer 30 is shown with a passive sensor. Referring next to FIG. 3, passive sensor 34 includes: two up-looking lenses 40 and 42; two down-looking lenses 44 and 46; an up-looking red filter 48 in optical alignment with lens 40; an up-looking near infrared filter 50 in optical alignment with lens 42; a down-looking red filter 49 in alignment with lens 44; a down-looking near infrared filter 51 in optical alignment with lense 46. For each lense 40–46 there is a corresponding photo detector 52–58. The output of each detector is directed to the input of an analog multiplexer 60 and to an analog to digital converter 62. Preferably, analog to digital converter 62 provides 12 bits of resolution, however the resolution of converter 62 is not critical. Converter 62 is in communication with microprocessor 64 such that, microprocessor 64 can select a particular photo detector via multiplexer 60, perform a conversion on the signal produced by the detector, and read the converted value from converter 62.

Reflectance for red is then calculated by dividing the intensity of reflected red light, as read from down-looking photo detector 56, by the intensity of the incident red light, as read from up-looking photo detector 52. The reflectance at near infrared is calculated in a similar manner by dividing the intensity of reflected near infrared, as read from detector 58 by the intensity of incident near infrared, as read from detector 54.

Referring again to FIG. 2, controller 36 includes a display 100 for providing instructions and data to the operator; switch 102 for providing power to analyzer 30. In addition, controller 36 includes an interface for a removable, non-volatile memory (not shown) for logging crop data; a global positioning system interface (not shown) for receiving and storing field coordinates and a tachometer input (not shown) for receiving pulses from a shaft encoder when used on a vehicle. These inputs allow analyzer 30 to store in nonvolatile memory, the condition of plants located at each particular site in a manner which allows later correlation of such data to a specific site. The stored data may then be used in forming a prescription map or for later analysis.

Figure 4:
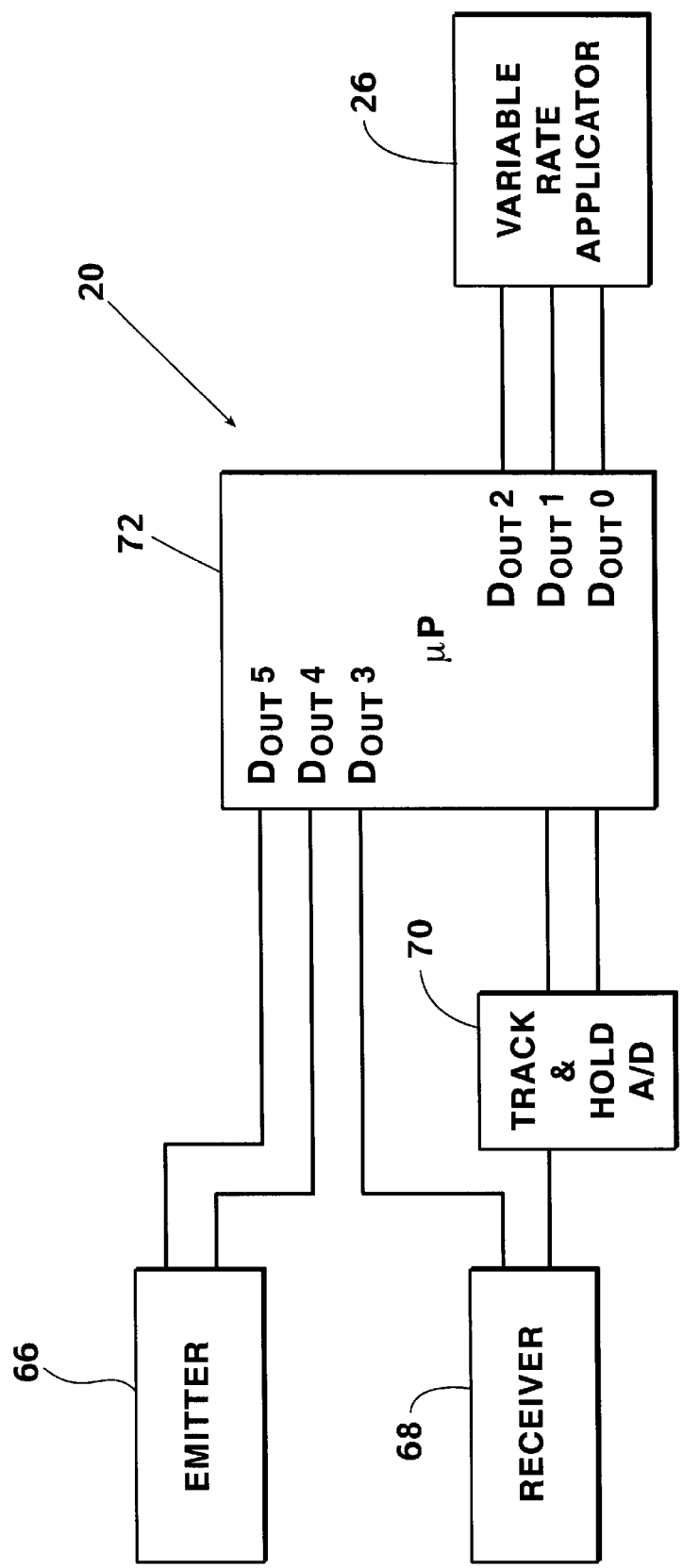
FIG. 4 provides a block diagram of an active reflectance sensor suitable for use with the inventive method.

Similarly, spreader 24 (FIGS. 1A and 1B) could employ either a passive sensor or an active sensor. For purposes of example only, sensor 20 is described herein as an active sensor such as the sensor described in the aforementioned co-pending U.S. patent application, Ser. No. 09/912,077 entitled "Optical Spectral Reflectance Sensor and Controller" filed contemporaneously herewith. Referring first to FIG. 4, active sensor 20 comprises: an emitter 66; a receiver 68; an analog to digital converter 70; and a microprocessor 72.

Figure 5:
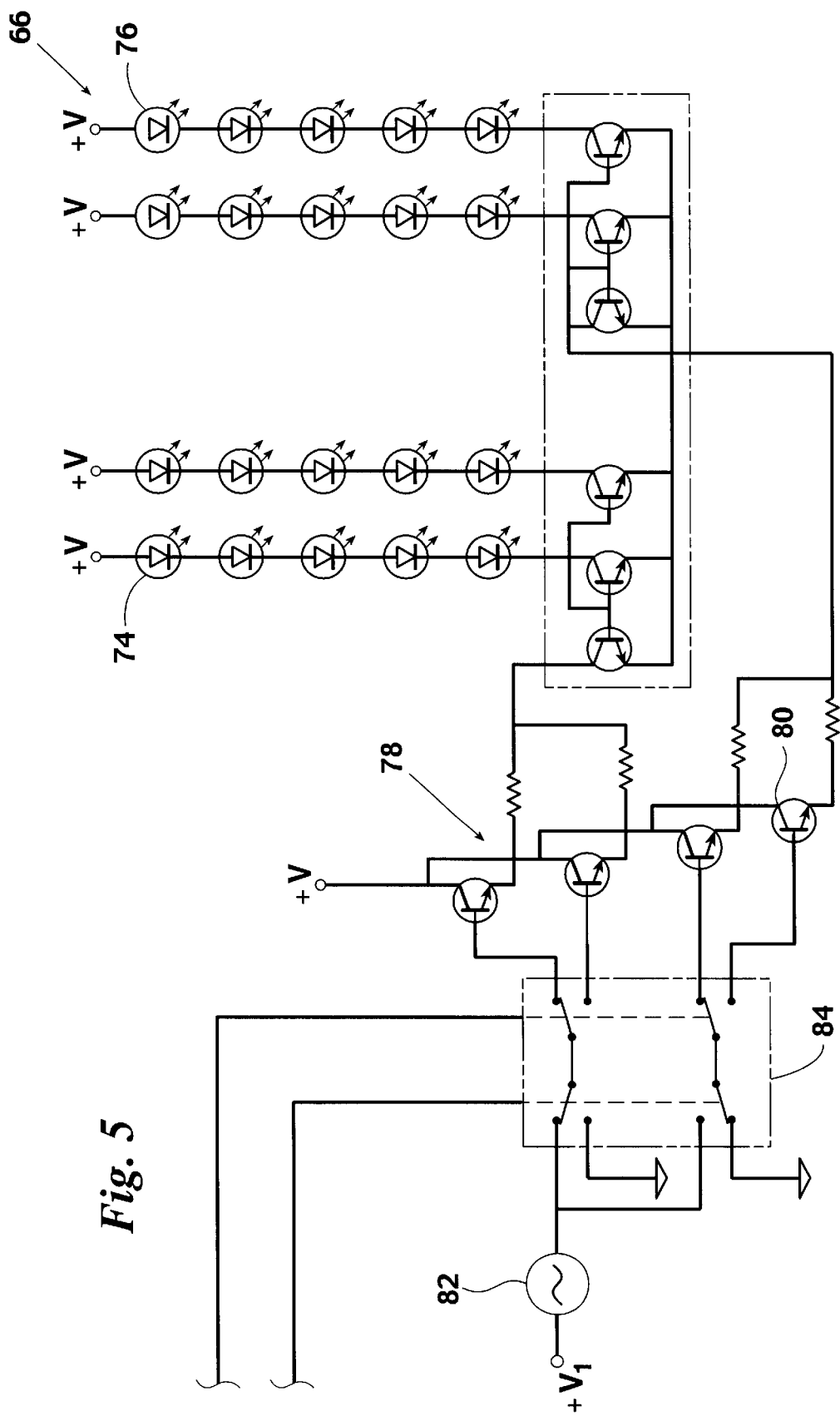
FIG. 5 provides a schematic representation of an emitter circuit employed in the active reflectance sensor.

Referring next to FIG. 5, emitter 66 includes: a red light source 74; an infrared light source 76; amplifiers 78 and 80 for driving sources 74 and 76, respectively; an oscillator 82 for modulating sources 74 and 76; and an analog selector 84 to allow microprocessor 72 (FIG. 4) to activate either the red light source 74 or the near infrared light source 76.

Figure 6:
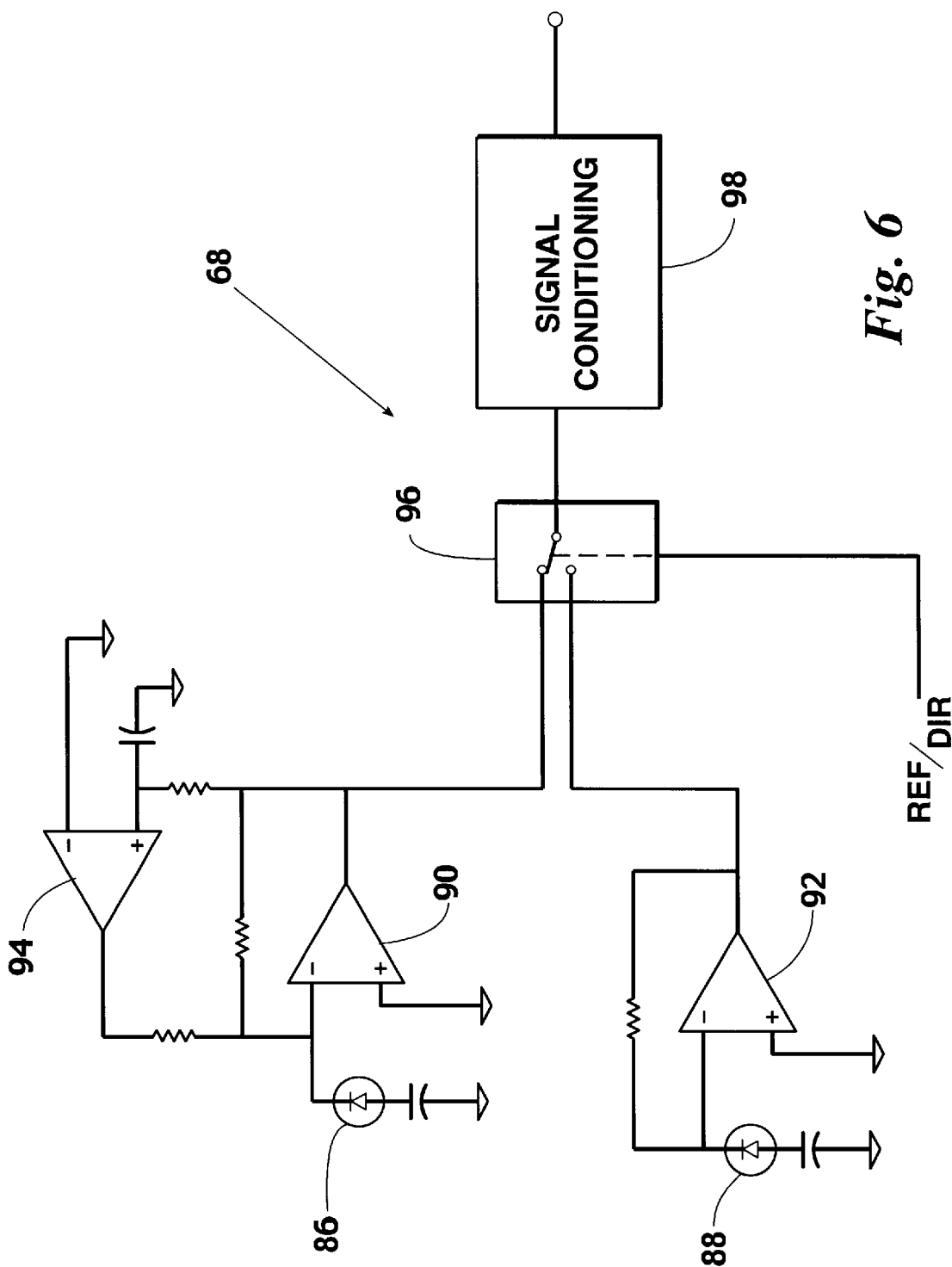
FIG. 6 provides a schematic representation of a receiver circuit employed in the active reflectance sensor.

Referring next to FIG. 6, receiver 68 includes: a reflected light photo detector 86 for receiving light reflected by an object in the view of the sensor 20; a direct light sensor 88 for receiving incident light from either the red source 74 or the near infrared source 76; amplifiers 90 and 92 for amplifying the signals received by detectors 86 and 88, respectively; amplifier 94 for compensating for ambient light striking detector 86; analog selector 96 for selecting between the signals of detector 86 or detector 88; and a signal conditioner 98 which bandpass filters the selected signal at the modulation frequency to discriminate between light from the emitter and ambient light.

Reflectance of the plant to red light is determined by dividing the output of the reflected light detector 86 by the output of the direct detector 88 while the red source 74 is active and the reflectance of the plant to near infrared is determined by dividing the output of the reflected light detector 86 by the output of the direct detector 88 while the infrared source 76 is active.

Although, as will become apparent from the discussion hereinbelow, the preferred embodiment of the inventive method requires reflectance information for both red light and near infrared light, the means by which the information is obtained is not critical. Thus, while two techniques are given by way of example, the inventive method is not so limited and, by way of further example and not by way of limitation, reflectance information could instead be determined by techniques such as aerial survey, image processing of video information, or the like.

The discussion provided hereinbelow is provided in regard to using the inventive method to improve the efficiency of farming cereal grain crops such as wheat, barley, corn, etc. It should be noted that the inventive method has far broader application and is useful for improving the growth of virtually any plant. While the constants given in the various equations may vary somewhat between various types of plants, the steps to arrive at the required fertilization rate are the same.

Essential to the inventive method is the determination of a normalized difference vegetation index (NDVI). One method of determining NDVI is through the scanning of a plant, or group of plants, to determine the reflectance of the plant at red light having a wavelength of approximately 670 nanometers and the reflectance of the plant at near infrared light having a wavelength of approximately 780 nanometers. NDVI is then calculated as follows:

$$NDVI=(NIR-red)/(NIR+red)$$

where "NIR" is reflectance at near infrared light and "red" is the reflectance value at red light. It should be noted that NDVI is a dimensionless value.

By way of example and not limitation, when the inventive method is used with wheat, reflectance readings are generally collected between 80 and 140 days after planting. The dates where readings are collected generally range between Feekes physiological growth stage 4 wherein leaf sheaths are beginning to lengthen, and stage 6 wherein the first node stem is visible. Reflectance readings from wheat are preferably taken from a surface area of approximately 1 meter squared. This area has been shown to be the resolution beyond which significant differences in soil test parameters exist.

As a preliminary matter, a nutrient response index ($RI_{NDVI}$) for the field must be determined. A pre-plant, non-N limiting strip will be established in each field at, or near, planting time. Regardless of the particular fertilization practice employed by a farmer, the non-N limiting strip can be used to determine the likelihood of obtaining a response to in-season N fertilizer, specifically tailored to that particular farmer's practice. Prior to applying topdress fertilizer, the non-N limiting strip will be scanned to determine NDVI, as well as a parallel strip fertilized according to the conventional practice of the farmer. The response index is may then be calculated as:

$RI_{NDVI}$=NDVI from the non-N limiting strip/NDVI from the farmer practice strip.

Where a non-N limiting strip was not established at or before planting, or no pre-plant nitrogen was added, $RI_{NDVI}$ may instead be determined by sensing the spatial variability in NDVI reading from one pass through the entire field. The response index computed from spatial variability ($RI_{SV}$) is calculated by:

$RI_{SV}$=(Average NDVI from one pass through the field+1 standard deviation)/(Average NDVI from the same pass−1 standard deviation)

Also prior to application of the topdress fertilizer the number of growing days since planting (GDP) must be determined. This information is readily available in virtually any agricultural area. Typically, growing days are tracked by government agencies, universities, large farming operations, and the like. It should be noted that the inventive method may also use growing days since emergence in lieu of growing days since planting. GDP may be adjusted by excluding days where ambient temperatures are low enough that the crop does not actively grow.

To calculate fertilization requirements, a plant or group of plants is next scanned to determine the plant's NDVI. Assuming GDP is greater than zero, from this, the in-season estimated yield index (INSEY) and the potential yield level ($YP_0$) with no added nitrogen are calculated as follows:

INSEY=NDVI/GDP $YP_0$=0.74076+0.10210$e^{0.57766 \cdot INSEY}$($YP_0$ in Mg/ha)

Next, the predicted attainable yield with added nitrogen ($YP_N$) is calculated as:

$YP_N$=$YP_0$*$RI_{NDVI}$($YP_N$ in Mg/ha)

where the response index was calculated as previously described. It should be noted that two limits are preferably imposed on this calculation, namely: 1) $RI_{NDVI}$ cannot exceed 2.0; and 2) $YP_N$ cannot exceed $YP_{MAX}$ where $YP_{MAX}$ is the biological maximum for a specific crop, grown within a specific region, and under defined management practices. The value of 2.0 for maximum $RI_{NDVI}$ may vary for a specific crop, grown in a specific region under different conditions.

The predicted percent of nitrogen in the grain (PNG) based on $YP_N$ is then calculated as:

PNG=−0.1918*$YP_N$+2.7836(PNG in % N)

Next, the predicted grain nitrogen uptake (GNUP) and the predicted forage nitrogen uptake ($FNUP_{NDVI}$) are calculated:

GNUP=PNG*($YP_N$/1000) kg/ha $FNUP_{NDVI}$=14.76+0.7758$e^{5.468 \cdot NDVI}$ kg/ha From these values, the in-season topdress fertilizer nitrogen requirement (FNR) is given by:

FNR=(GNUP−FNUP)/0.70

A divisor of 0.70 is used here since the theoretical maximum nitrogen use efficiency of an in-season N application is 70%.

It should be noted that this procedure produces results, which may be dramatically different from the procedures in current use. The inventive method prescribes increased nitrogen application rates in areas of the field with high yield potential as indicated by INSEY and reduced nitrogen application rates in areas of the field with lower yield potential. This is contrasted with prior thinking where nitrogen is applied in an attempt to bolster production in areas of a field having low production and withheld in areas of a field having relatively high production. Thus it can be seen that the purpose of the inventive method is to restrict the application of fertilizer nitrogen to just the amount required such that nitrogen is not the limiting factor in crop yield.

Initial experiments applying an embodiment of the inventive method resulted in a wheat yield increase of 0.54 Mg/ha while using only 68% of the fertilizer called for by conventional methods.

As will be apparent to those skilled in the art, the inventive method is well suited for incorporation into a software program for execution by a microprocessor or other computing device. When combined with a reflectance sensor as described hereinabove, the inventive method is ideally suited for use in a system which measures reflectance, calculates nitrogen requirements (FNR), and controls a variable rate applicator, in real time.

Research has shown that the INSEY index was a reliable predictor of final grain yield for 16 sites over a three-year period. Of particular importance was the finding that a single equation was able to predict yield over a broad production range, 0.5 Mg/ha to 6.0 Mg/ha.

The limits provided in regard to the calculation of $YP_N$ restrict the method to predicting reasonable production levels. Since $YP_N$ is extrapolated from observed growing conditions, it is important that reasonable biological and agronomic limits are applied to a predicted yield under optimum management and that a yield is not extrapolated beyond reasonable expectations.

Finally, it should also be noted that, while farming applications of the inventive method were discussed in relation to the preferred embodiment, the invention is not so limited. The inventive method could be used to improve the efficiency of the application of nitrogen fertilizer in virtually any crop. While the constants in the equations given above may vary from crop-to-crop, the inventive method is otherwise applicable to virtually any type of plant and can be applied with minor modification to any crop nutrient whose projected need could be based on predicted uptake in the grain, derived from predicted yield or $YP_0$.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method for determining an application rate for nitrogen fertilizer including the steps of;
    (a) determining a nutrient response index for a field;
    (b) determining the normalized difference vegetation index of an area to fertilize;
    (c) determining a predicted crop yield for said area;
    (d) determining an attainable crop yield for said area;
    (e) determining nitrogen uptake for the vegetation within said area;
    (f) determining the amount of fertilizer nitrogen required by said vegetation; and (g) providing communication of said amount of fertilizer nitrogen.

2. The method of claim 1 wherein step (a) includes the substeps of:
(a) determine a nutrient response index for a field by the substeps of:
(i) providing a first area treated with nitrogen fertilizer such that said first area is a non-N limiting fertilized area;
(ii) providing a second area treated with a predetermined amount of nitrogen fertilizer;
(iii) determining the normalized difference vegetation index for said first area;
(iv) determining the normalized difference vegetation index for said second area; and
(v) dividing said normalized difference vegetation index for said first area by said normalized difference vegetation index for said second area.

3. The method of claim 1 wherein step (b) includes the substeps of:
(b) determining the normalized difference vegetation index of an area to fertilize by performing the steps of:
(i) determining the reflectance of the vegetation in said area to red light;
(ii) determining the reflectance of the vegetation in said area to near infrared light;
(iii) dividing the difference of the reflectance determined step (b)(ii) minus the reflectance determined in step (b)(i) by the sum of the reflectance determined in step (b)(i) and the reflectance determined in step (b)(ii).

4. The method of claim 3 wherein the reflectance of the vegetation in said area to red light and the reflectance of the vegetation in said area to near infrared light are determined by scanning said vegetation with a reflectance sensor.

5. The method of claim 1 wherein step (c) includes the substeps of:
(c) determining a predicted crop yield for said area by performing the steps of:
(c)(i) determining the number of growing days since the planting of said crop;
(c)(ii) calculating the in-season estimated yield index for said area by dividing the normalized difference vegetation index by the number of growing days;
(c)(iii) calculating the predicted crop yield for said area as a function of the in-season estimated yield index for said area.

6. The method of claim 1 wherein said attainable crop yield is determined by multiplying said predicted crop yield times said response index.

7. The method of claim 1 wherein step (e) includes the substeps of:
(e) determining nitrogen uptake for the vegetation within said area by performing the steps of:
(i) predicting the percent of nitrogen in said crop based on said predicted crop yield;
(ii) determining the predicted nitrogen uptake of the grain of said vegetation;
(iii) determining the predicted nitrogen uptake for the forage of said vegetation.

8. The method of claim 7 wherein step (f) includes the substeps of:
(f) determining the amount of fertilizer nitrogen required by said vegetation by:
(i) subtracting the nitrogen uptake of the forage of said vegetation determined in step (e)(iii) from the predicted grain nitrogen uptake determined in step (e)(ii); and
(ii) dividing the result of step (f)(i) by the theoretical maximum nitrogen use efficiency.

9. A method for determining an application rate for nutrient fertilizer including the steps of:
(a) determining a response index of a particular nutrient for a field;
(b) determining the normalized difference vegetation index of an area to fertilize;
(c) determining a predicted crop yield for said area;
(d) determining an attainable crop yield for said area;
(e) determining nutrient uptake of said particular nutrient for the vegetation within said area;
(f) determining the amount of fertilizer containing said particular nutrient required by said vegetation; and
(g) providing communication of said amount of fertilizer.

* * * * *